US011752871B2

(12) United States Patent
Cho et al.

(10) Patent No.: US 11,752,871 B2
(45) Date of Patent: Sep. 12, 2023

(54) ELECTRONIC APPARATUS AND METHOD FOR OPERATING ELECTRONIC APPARATUS

(71) Applicant: LG Electronics Inc., Seoul (KR)

(72) Inventors: Sungil Cho, Seoul (KR); Jayoen Kim, Seoul (KR); Yujune Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 119 days.

(21) Appl. No.: 17/607,533

(22) PCT Filed: Apr. 29, 2019

(86) PCT No.: PCT/KR2019/005136
§ 371 (c)(1),
(2) Date: Oct. 29, 2021

(87) PCT Pub. No.: WO2020/222317
PCT Pub. Date: Nov. 5, 2020

(65) Prior Publication Data
US 2022/0212540 A1   Jul. 7, 2022

(51) Int. Cl.
*B60K 35/00* (2006.01)
*G06V 20/59* (2022.01)
(Continued)

(52) U.S. Cl.
CPC ............ *B60K 35/00* (2013.01); *B60W 40/08* (2013.01); *G06F 3/017* (2013.01); *G06V 20/597* (2022.01);
(Continued)

(58) Field of Classification Search
CPC .............. B60K 35/00; B60K 2370/152; B60K 2370/146; B60K 2370/21; G06V 20/597; B60W 40/08; G06F 3/017
See application file for complete search history.

(56) References Cited

U.S. PATENT DOCUMENTS 10,493,997 B2 *  12/2019  Kim .................... G05D 1/0061
2006/0167630 A1 *   7/2006  Noma ................... G06F 30/15
                                                        701/117
(Continued)

FOREIGN PATENT DOCUMENTS

JP      2014-169022      9/2014
KR       101588186       1/2016
(Continued)

OTHER PUBLICATIONS

International Search Report in International Appln. No. PCT/KR2019/005136, dated Jan. 29, 2020, 5 pages (with English translation).
(Continued)

*Primary Examiner* — Chico A Foxx
(74) *Attorney, Agent, or Firm* — Fish & Richardson P.C

(57) ABSTRACT

The present disclosure relates to an electronic apparatus including: a camera; a display unit; a processor configured to monitor a passenger, based on a vehicle internal image data generated by the camera; a printed circuit board configured to be electrically connected to the camera, the display unit, and the processor; a case configured to form an outer shape by being coupled to the display unit with the printed circuit board interposed therebetween; and a mounting portion configured to fix the case to a portion of a vehicle seat.

8 Claims, 12 Drawing Sheets

(51) Int. Cl.
*G06F 3/01* (2006.01)
*B60W 40/08* (2012.01)

(52) U.S. Cl.
CPC .. *B60K 2370/146* (2019.05); *B60K 2370/152* (2019.05); *B60K 2370/21* (2019.05)

(56) References Cited

U.S. PATENT DOCUMENTS

| | | | | |
|---|---|---|---|---|
| 2007/0080816 A1* | 4/2007 | Haque | ................. | B60K 28/066 340/576 |
| 2012/0262403 A1* | 10/2012 | Tissot | ................... | B60K 37/06 345/173 |
| 2012/0280542 A1 | 11/2012 | Wood | | |
| 2015/0312404 A1* | 10/2015 | Abramson | .............. | H04W 8/02 455/418 |
| 2015/0352953 A1* | 12/2015 | Koravadi | .............. | B60K 37/06 701/36 |
| 2016/0090104 A1* | 3/2016 | Diaz-Jimenez | ........ | B60K 26/02 701/70 |
| 2016/0218999 A1* | 7/2016 | Arita | ................. | G01C 21/3664 |
| 2017/0013188 A1* | 1/2017 | Kothari | ................... | G06F 3/017 |
| 2017/0075701 A1* | 3/2017 | Ricci | .................... | G06F 3/0637 |
| 2018/0011534 A1* | 1/2018 | Poulos | .................... | G06F 3/011 |
| 2018/0356897 A1* | 12/2018 | Hoggarth | ................ | G06F 3/017 |
| 2019/0391581 A1* | 12/2019 | Vardaro | ............. | A61B 5/02055 |
| 2020/0055397 A1* | 2/2020 | Zhao | ....................... | G06F 3/048 |
| 2020/0082188 A1* | 3/2020 | Singh | ................... | G08B 25/016 |
| 2020/0406752 A1* | 12/2020 | Ahn | ...................... | G06F 3/04883 |
| 2021/0107527 A1* | 4/2021 | Karve | .................. | B62D 15/025 |
| 2021/0256933 A1* | 8/2021 | Kurebayashi | .......... | B60Q 1/085 |
| 2021/0261050 A1* | 8/2021 | Sobhany | ................ | B60Q 3/80 |
| 2021/0358492 A1* | 11/2021 | Kim | ....................... | B60W 50/10 |
| 2022/0101027 A1* | 3/2022 | Kang | .................... | G06V 20/597 |
| 2022/0203996 A1* | 6/2022 | Katz | .................. | G06V 10/7715 |

FOREIGN PATENT DOCUMENTS

| | | |
|---|---|---|
| KR | 101678093 | 11/2016 |
| KR | 20160133694 | 11/2016 |
| KR | 20180053180 | 5/2018 |
| KR | 101948249 | 2/2019 |

OTHER PUBLICATIONS

Office Action in Korean Appln. No. 10-2021-7035014, dated Nov. 23, 2022, 10 pages (with English translation).

* cited by examiner

ELECTRONIC APPARATUS AND METHOD FOR OPERATING ELECTRONIC APPARATUS

CROSS-REFERENCE TO RELATED APPLICATIONS

This application is a National Stage application under 35 U.S.C. § 371 of International Application No. PCT/KR2019/005136, filed on Apr. 29, 2019. The disclosure of the prior application is incorporated by reference in its entirety.

TECHNICAL FIELD

The present disclosure relates to an electronic apparatus and a method for operating the electronic apparatus.

BACKGROUND ART

A vehicle is an apparatus that moves a user in a desired direction. A typical example is a car. Recently, a device for monitoring a driver's state has been applied to products. In the case of an autonomous vehicle, a device for monitoring the state of not only the driver but also the passengers has been developed. Meanwhile, a monitoring device according to the related art is fixedly mounted inside the vehicle. In this case, there is a problem in that as the viewing angle of a camera is fixed, data suitable for situation cannot be acquired. For example, the monitoring device according to the related art has a problem in that when an infant seat is installed so that an infant faces the rear of vehicle, the state of the infant cannot be monitored.

DISCLOSURE

Technical Problem

In order to solve the above problems, an object of the present disclosure is to provide an electronic apparatus capable of adaptively monitoring a passenger in various situations and providing appropriate content to the passenger.

The problems of the present disclosure are not limited to the problems mentioned above, and other problems not mentioned will be clearly understood by those skilled in the art from the following description.

Technical Solution

In order to achieve the above object, an electronic apparatus according to an embodiment of the present disclosure includes: a camera; a display unit; a processor configured to monitor a passenger, based on a vehicle internal image data generated by the camera; a printed circuit board configured to be electrically connected to the camera, the display unit, and the processor; a case configured to form an outer shape by being coupled to the display unit with the printed circuit board interposed therebetween; and a mounting portion configured to fix the case to a portion of a vehicle seat.

The details of other embodiments are included in the detailed description and drawings.

Advantageous Effects

According to the present disclosure, there are one or more of the following effects.

First, there is an effect of increasing user convenience by adaptively utilizing the functions of the electronic apparatus in various situations.

Second, there is an effect of implementing a user-friendly environment when using a vehicle, by changing the posture of a display or controlling the output contents according to the situation of the passenger.

The effects of the present disclosure are not limited to the effects mentioned above, and other effects not mentioned can be clearly understood by those skilled in the art from the description of the claims.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

Terms such as "includes" or "has" used herein should be considered as indicating the presence of several components, functions or steps, disclosed in the specification, and it is also understood that more or fewer components, functions, or steps may likewise be utilized.

Figure 1:
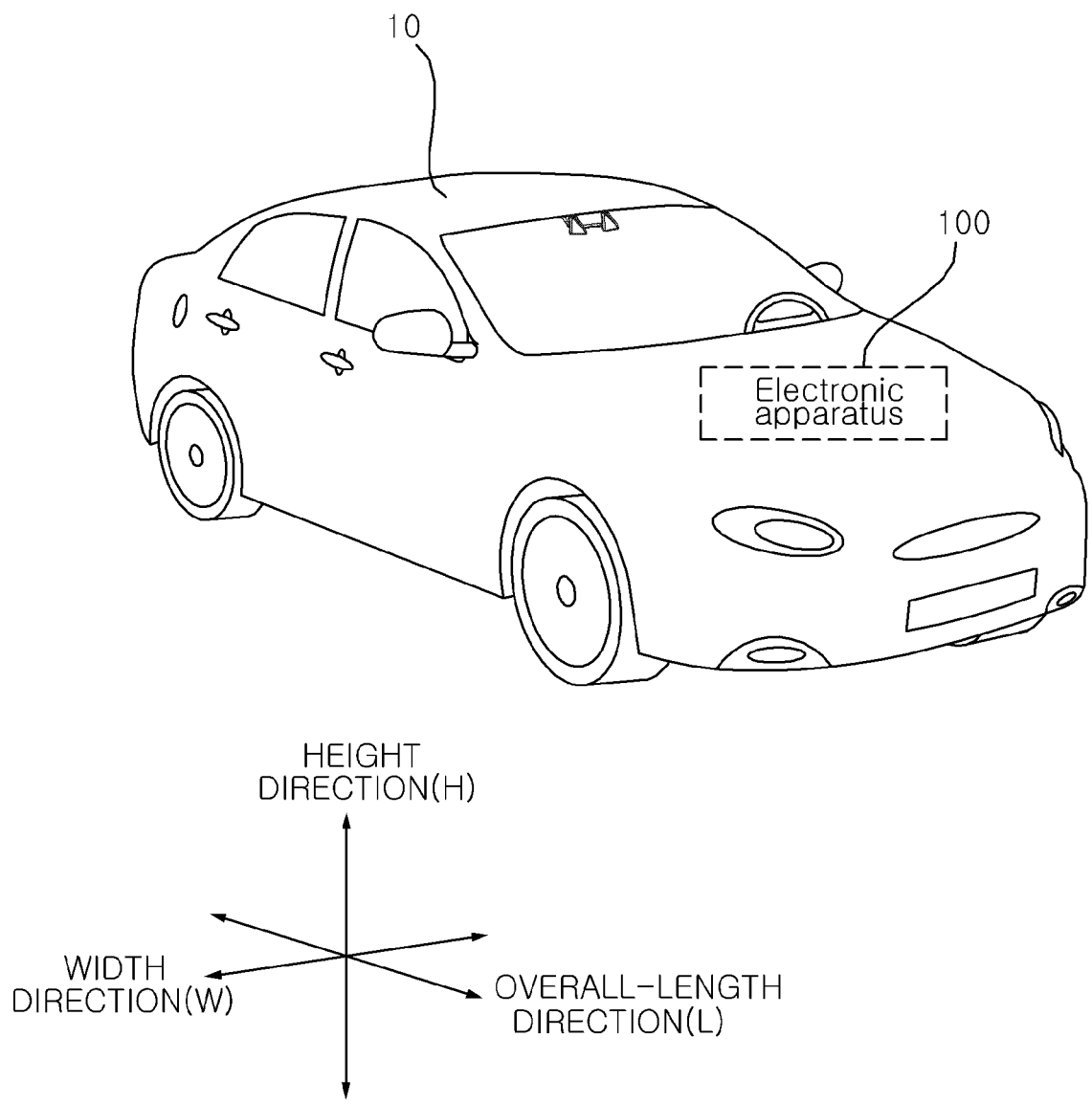
FIG. 1 is a diagram illustrating a vehicle according to an embodiment of the present disclosure.

FIG. 1 is a diagram illustrating a vehicle according to an embodiment of the present disclosure.

Referring to FIG. 1, a vehicle 10 according to an embodiment of the present disclosure is defined as a transportation means running on a road or track. The vehicle 10 is a concept including a car, a train, and a motorcycle. The vehicle 10 may be a concept including all of an internal combustion engine vehicle having an engine as a power source, a hybrid vehicle having an engine and an electric motor as a power source, an electric vehicle having an electric motor as a power source, and the like. The vehicle 10 may be an autonomous vehicle.

The electronic apparatus 100 may be used in the interior of the vehicle 10. The electronic apparatus 100 may be mounted and used in one area of the interior of the vehicle 10. The electronic apparatus 100 may monitor passengers or provide content. The electronic apparatus 100 may be disposed adaptively to the posture and position of the passenger. The electronic apparatus 100 may set a posture according to the posture and position of the passenger or may control the provided content.

Figure 2:
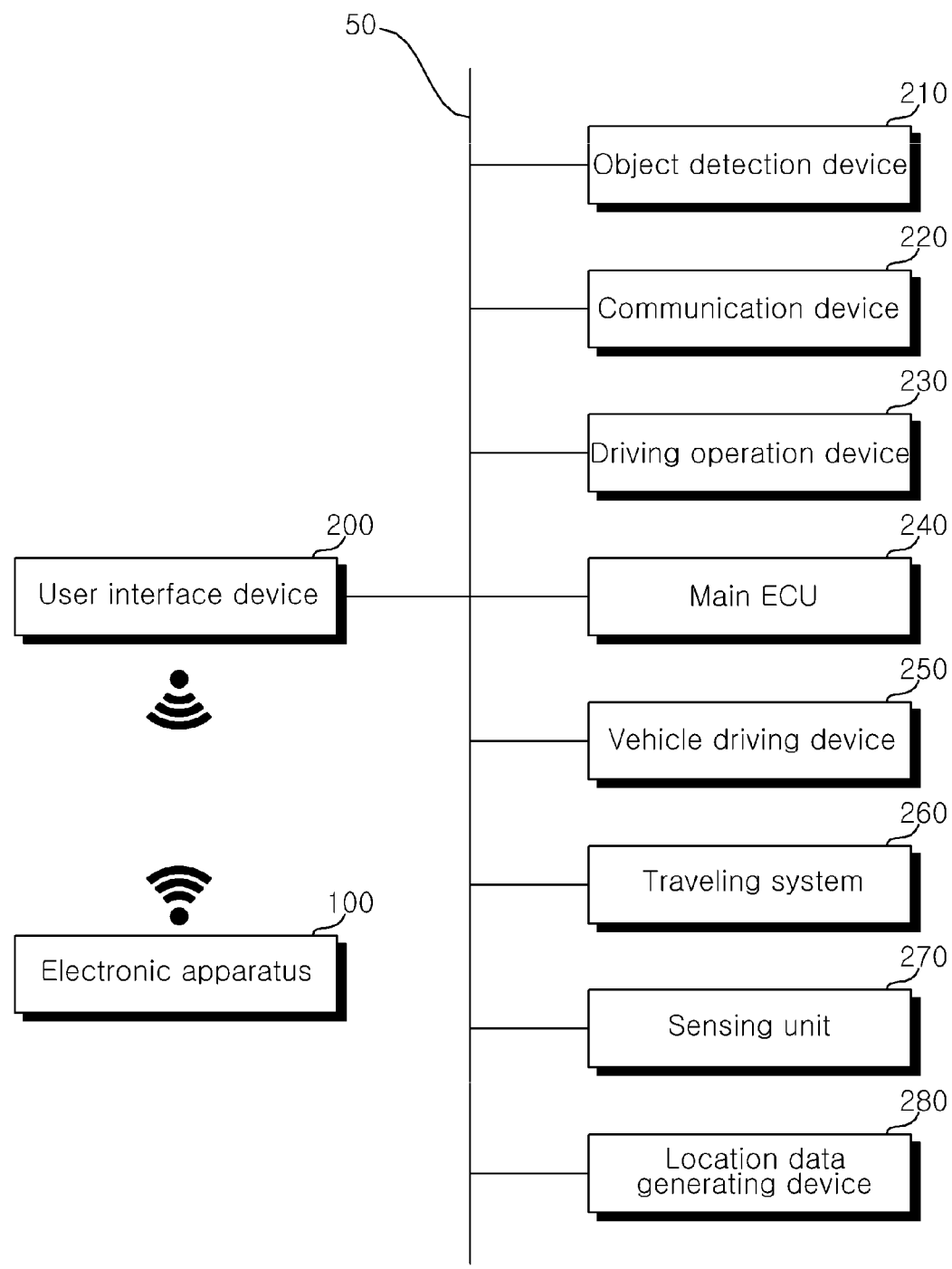
FIG. 2 is a control block diagram of a vehicle according to an embodiment of the present disclosure.

FIG. 2 is a control block diagram of a vehicle according to an embodiment of the present disclosure.

Referring to FIG. 2, the vehicle 10 includes a user interface device 200, an object detection device 210, a communication device 220, a driving operation device 230, a main ECU 240, a vehicle driving device 250, a traveling system 260, a sensing unit 270, and a location data generating device 280.

The user interface device 200 is a device for communication between the vehicle 10 and a user. The user interface device 200 may receive a user input and provide information generated in the vehicle 10 to the user. The vehicle 10 may implement User Interfaces UI or User Experience UX through the user interface device 200. To this end, the user interface device 200 may include a display unit and a speaker.

The object detection device 210 may detect an object outside the vehicle 10. The object detection device 210 may include at least one of a camera, a radar, a lidar, an ultrasonic sensor, and an infrared sensor. The object detection device 210 may provide data on an object generated based on a sensing signal generated by a sensor to at least one electronic apparatus contained in the vehicle.

The communication apparatus 220 may exchange signals with a device located outside the vehicle 10. The communication device 220 may exchange signals with at least one of an infrastructure (e.g. a server, a broadcasting station) and other vehicle. The communication device 220 may include at least one of a transmit antenna, a receive antenna, a radio frequency (RF) circuit capable of implementing various communication protocols, and an RF element so as to perform communication.

The driving operation device 230 is a device that receives a user input for driving. In a manual mode, the vehicle 10 may travel based on a signal provided by the driving operation device 230. The driving operation device 230 may include a steering input device (e.g. a steering wheel), an acceleration input device (e.g. an accelerator pedal), and a brake input device (e.g. a brake pedal).

The main ECU 240 may control the overall operation of at least one electronic apparatus included in the vehicle 10.

The vehicle driving device 250 is a device that electrically controls driving of various devices in the vehicle 10. The vehicle driving unit 250 may include a power train driving unit, a chassis driving unit, a door/window driving unit, a safety device driving unit, a lamp driving unit, and an air conditioning driving unit. The power train driving unit may include a power source driving unit and a transmission driving unit. The chassis driving unit may include a steering driving unit, a brake driving unit, and a suspension driving unit.

Meanwhile, the safety device driving unit may include a seat belt driving unit for seat belt control.

The ADAS 260 may generate a signal for controlling the movement of the vehicle 10 or outputting information to the user, based on the data on object received from the object detection device 210. The ADAS 260 may provide the generated signal to at least one of the user interface device 200, the main ECU 240, and the vehicle driving device 250.

The ADAS 260 may implement at least one of Adaptive Cruise Control (ACC), Autonomous Emergency Braking (AEB), Forward Collision Warning (FCW), Lane Keeping Assist (LKA), Lane Change Assist (LCA), Target Following Assist (TFA), Blind Spot Detection (BSD), adaptive High Beam Assist (HBA), Auto Parking System (APS), PD collision warning system, Traffic Sign Recognition (TSR), Traffic Sign Assist (TSA), Night Vision (NV), Driver Status Monitoring (DSM), and Traffic Jam Assist (TJA).

The sensing unit 270 may sense the state of the vehicle. The sensing unit 270 may include at least one of an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor for steering wheel rotation, an vehicle inner temperature sensor, an vehicle inner humidity sensor, an ultrasonic sensor, an illuminance sensor, an accelerator pedal position sensor, and a brake pedal position sensor. Meanwhile, the inertial navigation unit (IMU) sensor may include at least one or more of an acceleration sensor, a gyro sensor, and a magnetic sensor.

The sensing unit 270 may generate state data of the vehicle, based on a signal generated by at least one sensor. The sensing unit 270 may acquire a sensing signal for vehicle posture information, vehicle motion information, vehicle yaw information, vehicle roll information, vehicle pitch information, vehicle collision information, vehicle direction information, vehicle angle information, and vehicle speed information, vehicle acceleration information, vehicle inclination information, vehicle forward/reverse information, battery information, fuel information, tire information, vehicle lamp information, vehicle inner temperature information, vehicle inner humidity information, steering wheel rotation angle, vehicle exterior illumination, pressure applied to the accelerator pedal, pressure applied to the brake pedal, and the like.

In addition, the sensing unit 270 may further include an accelerator pedal sensor, a pressure sensor, an engine speed sensor, an air flow sensor (AFS), an air temperature sensor (ATS), a water temperature sensor (WTS), and a throttle position sensor. (TPS), a TDC sensor, a crank-shaft position sensor (CAS), and the like.

The sensing unit 270 may generate vehicle state information, based on sensing data. The vehicle state information may be information generated based on data sensed by various sensors provided inside the vehicle.

For example, the vehicle state information may include vehicle posture information, vehicle speed information, vehicle inclination information, vehicle weight information, vehicle direction information, vehicle battery information, vehicle fuel information, vehicle tire pressure information, vehicle steering information, vehicle inner temperature information, vehicle inner humidity information, pedal position information, vehicle engine temperature information, and the like.

Meanwhile, the sensing unit may include a tension sensor. The tension sensor may generate a sensing signal based on a tension state of the seat belt.

The location data generating device 280 may generate location data of the vehicle 10. The location data generating device 280 may include at least one of a Global Positioning System (GPS) and a Differential Global Positioning System (DGPS). The location data generating device 280 may generate location data of the vehicle 10 based on a signal generated from at least one of GPS and DGPS. According to an embodiment, the location data generating device 280 may correct location data based on at least one of an Inertial Measurement Unit (IMU) of the sensing unit 270 and a camera of the object detection device 210.

The vehicle 10 may include an internal communication system 50. A plurality of electronic apparatus contained in the vehicle 10 may exchange signals via the internal communication system 50. A signal may contain data. The internal communication system 50 may use at least one communication protocol (e.g. CAN, LIN, FlexRay, MOST, Ethernet).

The electronic apparatus 100 may exchange signals with at least one electronic apparatus provided in the vehicle 10. For example, the electronic apparatus 100 may exchange signals with the user interface device 200, by using short-range wireless communication. The electronic apparatus 100 may provide passenger monitoring information to the user interface device 200. The electronic apparatus 100 may provide vehicle interior image data generated by a camera included in the electronic apparatus 100 to the user interface device 200.

Figure 3:
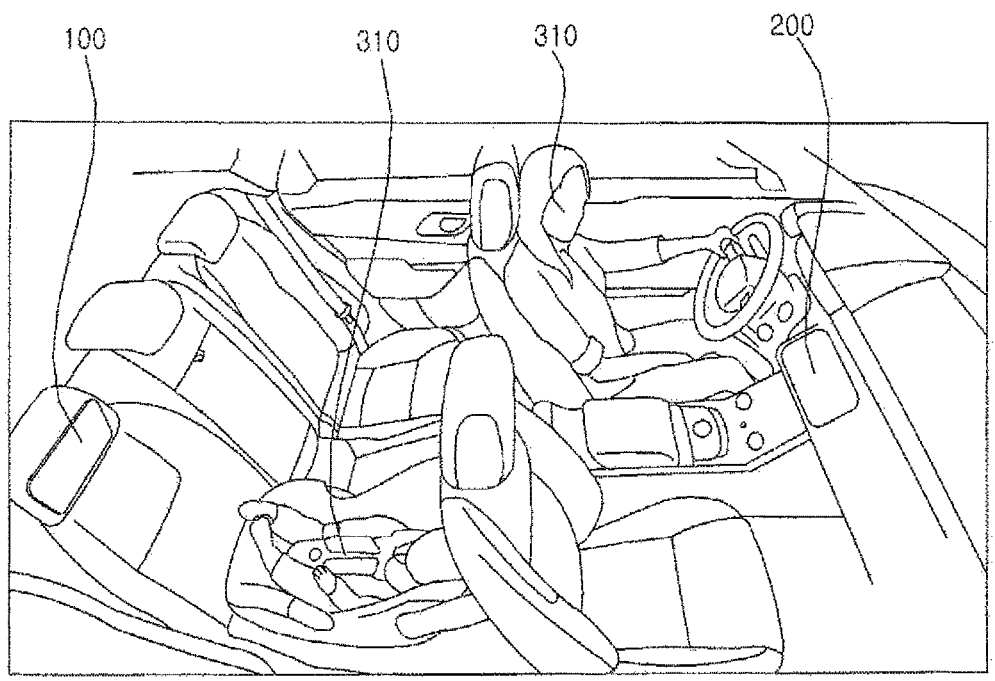
FIG. 3 is a diagram illustrating the interior of a vehicle according to an embodiment of the present disclosure.

FIG. 3 is a diagram illustrating the interior of a vehicle according to an embodiment of the present disclosure.

Figure 4:
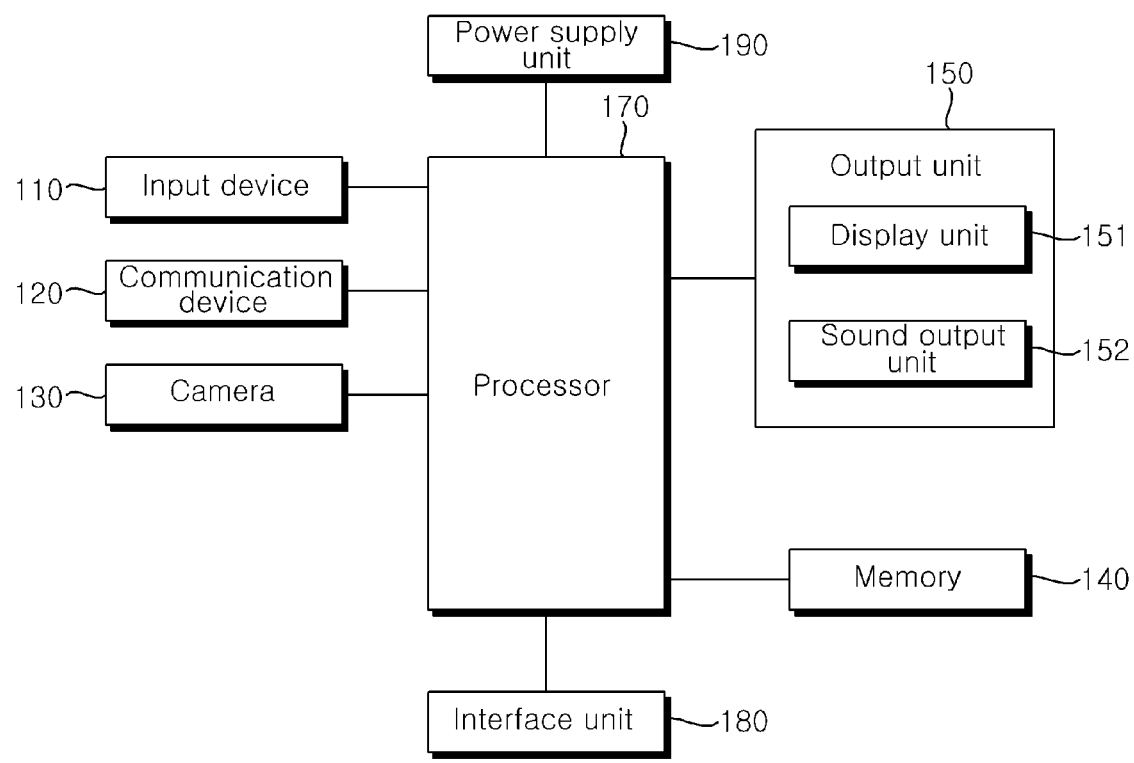
FIG. 4 is a control block diagram of an in-vehicle electronic apparatus according to an embodiment of the present disclosure.

FIG. 4 is a control block diagram of an in-vehicle electronic apparatus according to an embodiment of the present disclosure.

Referring to FIGS. 3 to 4, the electronic apparatus 100 may include an input device 110, a communication device 120, a camera 130, a memory 140, an output unit 150, a processor 170, an interface unit 180, and a power supply unit 190.

The input device 110 may receive a user's input. The input device 110 may convert a user's input into an electrical signal. The input device 110 may include a voice input unit, a gesture input unit, a touch input unit, and a mechanical input unit.

The voice input unit may convert a user's voice input into an electrical signal. The converted electrical signal may be provided to the processor 170. The voice input unit may include one or more microphones. The gesture input unit may convert a user's gesture input into an electrical signal. The converted electrical signal may be provided to the processor 170. The gesture input unit may include at least one of an infrared sensor and an image sensor for detecting the user's gesture input. In some embodiments, the gesture input unit may detect a user's 3D gesture input. To this end, the gesture input unit may include a light output unit that outputs a plurality of infrared rays or a plurality of image sensors. The gesture input unit may detect the user's 3D gesture input through a time of flight (TOF) method, a structured light method, or a disparity method. The touch input unit may convert the user's touch input into an electrical signal. The converted electrical signal may be provided to the processor 170. The touch input unit may include a touch sensor for detecting a user's touch input. In some embodiments, the touch input unit may be formed integrally with the display unit 151 to implement a touch screen. Such a touch screen may provide both an input interface and an output interface between the vehicle 10 and the user. The mechanical input unit may include at least one of a button, a dome switch, a jog wheel, and a jog switch. The electrical signal generated by the mechanical input may be provided to the processor 170. The mechanical input unit may be disposed in a steering wheel, a center fascia, a center console, a cockpick module, a door, and the like.

The communication device 120 may exchange signals with at least one electronic apparatus provided in the vehicle 10.

The communication device 120 may exchange signals with the user interface device 200 provided in the vehicle 10 through short-range communication. The communication device 120 may include at least one of a transmit antenna, a receive antenna, a radio frequency (RF) circuit capable of implementing a short-range communication protocol, and an RF element, so as to perform short-range communication.

The communication device 120 may exchange signals with a mobile terminal through mobile communication. The communication device 120 may include at least one of a transmit antenna, a receive antenna, an RF circuit capable of implementing a mobile communication protocol, and an RF element, so as to perform mobile communication.

The camera 130 may sense a user. The camera 130 may acquire a vehicle inner image. The camera 130 may detect a user based on the vehicle inner image. The camera 130 may sense basic personal information (e.g. gender, age, body type, race, fashion, etc.) of the user based on the vehicle inner image.

The memory 140 is electrically connected to the processor 170. The memory 140 may store basic data for a unit, control data for operation control of a unit, and input/output data. The memory 140 may store data processed by the processor 170. The memory 140 may be configured as at least one of ROM, RAM, EPROM, flash drive, and hard drive, in terms of hardware. The memory 140 may store various data for the overall operation of the electronic apparatus 100, such as a program for processing or controlling the processor 170. The memory 140 may be implemented integrally with the processor 170. In some embodiments, the memory 140 may be classified into a sub-configuration of the processor 170.

The output unit 150 is implemented to generate an output related to sight and hearing. The output unit 150 may include a display unit 151 and a sound output unit 152.

The display unit 251 may display a graphic object, based on a signal provided from the processor 170. The display unit 251 may be implemented as a head up display (HUD). When the display unit 251 is implemented as a HUD, the display unit 251 may include a projection module to output information through an image projected on a windshield or window. The display unit 251 may include a transparent display. The transparent display may be attached to a windshield or window. Meanwhile, in some embodiments, a plurality of display units 251 may be provided. In addition to the display unit implemented as a HUD, a display unit disposed in one area of a steering wheel, one area of an instrument panel, one area of a seat, one area of each pillar, one area of a door, one area of a center console, one area of a head lining, and one area of a sun visor may be further included.

The sound output unit 252 may convert an electrical signal provided from the processor 170 into an audio signal and output the audio signal. To this end, the sound output unit 252 may include at least one speaker.

The interface unit 180 may exchange signals with at least one electronic apparatus provided in the vehicle 10 by wire or wirelessly. The interface unit 280 may exchange signals with at least one of the object detection device 210, the communication device 220, the driving operation device 230, the main ECU 140, the vehicle driving device 250, the ADAS 260, the sensing unit 170, and the location data generating device 280 by wire or wirelessly. The interface unit 280 may be composed of at least one of a communication module, a terminal, a pin, a cable, a port, a circuit, an element, and a device.

The interface unit 180 may receive location data of the vehicle 10 from the location data generating device 280. The interface unit 180 may receive traveling speed data from the sensing unit 270. The interface unit 180 may receive object data around the vehicle from the object detection device 210.

The power supply unit 190 may supply power to the electronic apparatus 100. The power supply unit 190 may receive power from a power source (e.g. a battery) contained in the vehicle 10, and supply power to each unit of the electronic apparatus 100. The power supply unit 190 may be operated according to a control signal provided from the main ECU 140. The power supply unit 190 may be implemented as a switched-mode power supply (SMPS).

The processor 170 may be electrically connected to the memory 140, the interface unit 280, and the power supply unit 190 to exchange signals. The processor 170 may be electrically connected to the input device 110, the communication device 120, the camera 130, and the output unit 150 to exchange signals. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The processor 170 may be driven by power provided from the power supply unit 190. The processor 170 may receive data, process data, generate a signal, and provide a signal while power is supplied by the power supply unit 190.

The processor 170 may receive vehicle inner image generated by the camera 130.

The processor 170 may monitor a passenger, based on vehicle inner image data generated by the camera 130. The processor 170 may determine the state of the passenger, based on the vehicle inner image data. For example, the processor 170 may determine the situation such as vomiting, high fever, apnea, etc. of an infant sitting in a car seat while looking at the rear of the vehicle 10. For example, the processor 170 may determine whether the infant is out of view of the camera 130.

The processor 170 may determine the posture of the passenger, based on the vehicle inner image data. The processor 170 may select a user's input method, based on the determined posture information of the passenger. The processor 170 may determine whether the passenger's posture is a lean forward posture or a lean back posture, based on whether the passenger's back or head is in contact with the seat. The processor 170 may select a touch input method, when it is determined that the posture of the passenger is a lean forward posture. The processor 170 may select a hand gesture input method, when it is determined that the posture of the passenger is a lean back posture.

When it is determined that the passenger's state is in an abnormal state, the processor 170 may provide a signal for outputting an alarm to the user interface device 200 through the communication device 120. The user interface device 200 may output an alarm. Meanwhile, the abnormal state of the passenger may be a health abnormal state of the passenger. The processor 170 may determine the health abnormal state of the passenger, based on a passenger's facial expression, gesture, and the like.

The processor 170 may provide the vehicle inner image data to the mobile terminal, when a passenger is detected in a state where a preset time or longer is elapsed, after the vehicle 10 is turned off. For example, when only an infant remains in the interior of vehicle while a protector is alighted, the protector can recognize a situation by providing the vehicle inner image data to a protector's mobile terminal.

The processor 170 may acquire passenger information, based on the vehicle inner image data, and control output of content through the display unit 151 based on the passenger information.

For example, the processor 170 may acquire age information of the passenger, and output content matched with the age information. For example, the processor 170 may recognize the passenger, and output pre-stored preferred content of the passenger. For example, the processor 170 may acquire information on a passenger's sleeping state, and stop outputting the content. For example, the processor 170 may acquire information on a state of passenger's gaze on a still screen, and may continuously output a next content of previous content. For example, when it is determined that the passenger is a child, the processor 170 may output the content in a low voice. For example, when it is determined that the passenger is an adult, the processor 170 may output the content at a low frequency.

The electronic apparatus 100 may include at least one printed circuit board (PCB). The printed circuit board can be electrically connected with the input device 110, the communication device 120, the camera 130, the memory 140, the output unit 150, the interface unit 180, the power supply unit 190, and the processor 170.

Figure 5:
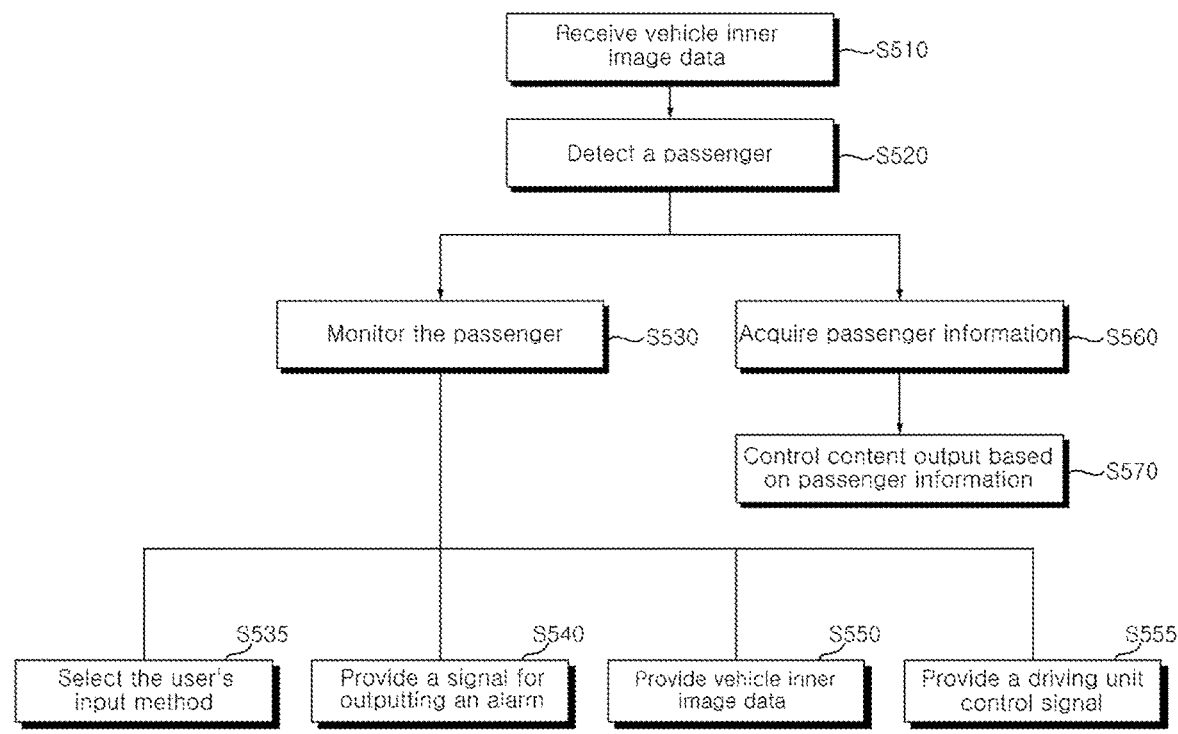
FIG. 5 is a flowchart of an in-vehicle electronic apparatus according to an embodiment of the present disclosure.

FIG. 5 is a flowchart of an in-vehicle electronic apparatus according to an embodiment of the present disclosure.

Referring to FIG. 5, the processor 170 may receive vehicle inner image data from the camera 130 (S510). The processor 170 may detect a passenger (S520).

The processor 170 may monitor the passenger, based on the vehicle inner image data (S530). The processor 170 may determine the posture of the passenger. For example, the processor 170 may determine whether the passenger's posture is a lean forward posture or a lean back posture, based on whether the passenger's back or head is in contact with the seat. The processor 170 may determine the state of the passenger. For example, the processor 170 may determine whether the passenger's state is abnormal, based on the passenger's facial expression and gesture. The processor 170 may determine whether a passenger is detected in a state where a preset time or longer is elapsed, after an ignition of the vehicle 10 is turned off. The processor 170 may detect the gaze of the passenger.

The processor 170 may select the user's input method, based on the passenger's posture information (S535). For example, when the posture of the passenger is determined to be a lean forward posture, the processor 170 may select a touch input method. For example, the processor 170 may select a hand gesture input method, when it is determined that the posture of the passenger is a lean back posture.

When it is determined that the passenger's state is abnormal, the processor 170 may provide a signal for outputting an alarm to the user interface device 200 through the communication device 120 (S540).

When a passenger is detected in a state where a preset time or longer is elapsed after the ignition of the vehicle 10 is turned off, the processor 170 may provide vehicle 10 inner image data to the mobile terminal (S550).

The processor 170 may provide a control signal to the driving unit, based on the passenger's gaze information (S550). The driving unit may provide a rotational driving force to a connection portion, so that the display posture may be set to a suitable posture in which a passenger can view content.

Meanwhile, after detecting the passenger at step S520, the processor 170 may acquire passenger information (S560). The processor 170 may control content output, based on passenger information (S570). For example, the processor 170 may acquire age information of the passenger and output content matched with the age information. For example, the processor 170 may recognize the passenger, and output pre-stored preferred content of the passenger. For example, the processor 170 may acquire information on the sleeping state of the passenger and stop outputting the content. For example, the processor 170 may acquire information on a state of passenger's gaze on a still screen, and may continuously output a next content of previous content. For example, when it is determined that the passenger is a child, the processor 170 may output the content in a low voice. For example, when it is determined that the passenger is an adult, the processor 170 may output the content at a low frequency.

FIGS. 6 to 9 are diagrams referenced for explaining an electronic apparatus from a structural point of view.

Figure 6:
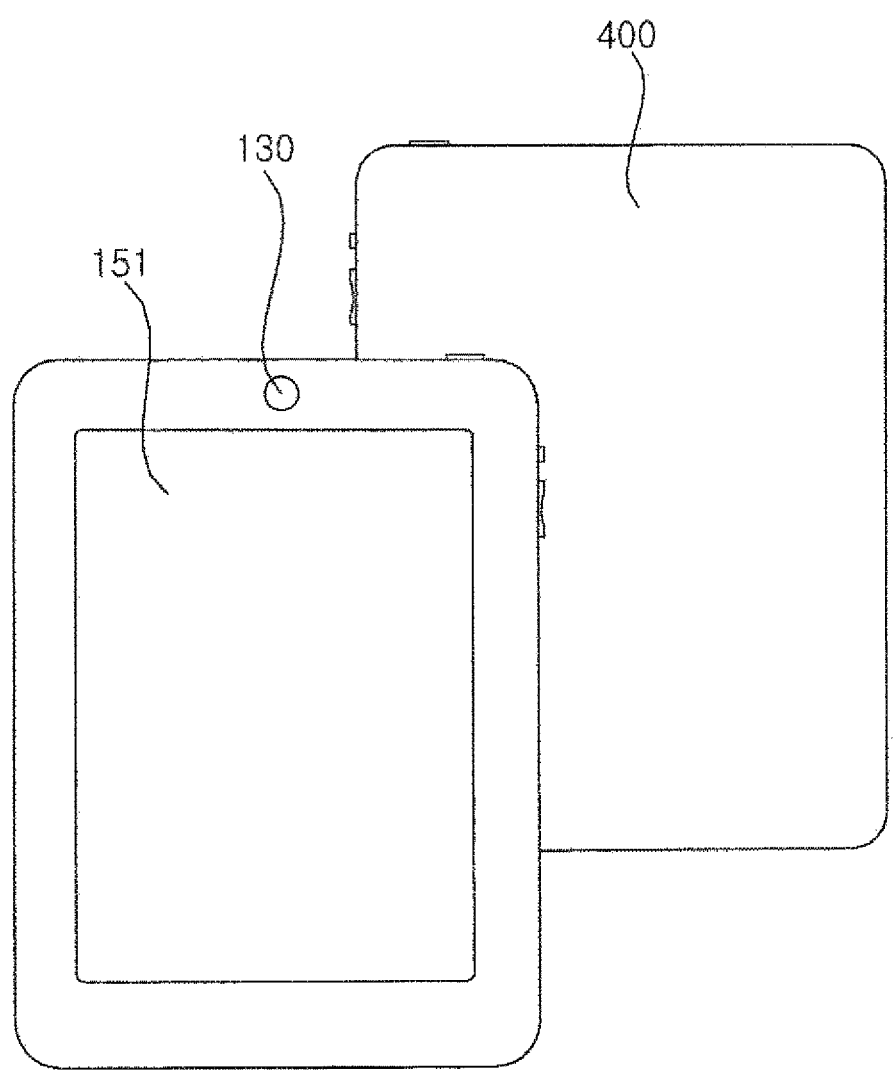
FIGS. 6 to 9 are diagrams referenced for explaining an electronic apparatus from a structural point of view.

FIG. 6 is a diagram illustrating an outer shape of an electronic apparatus according to an embodiment of the present disclosure.

Referring to FIG. 6, the electronic apparatus 100 may include a camera 130, a display unit 151, and a case 400. The camera 130, the display unit 151, and the case 400 may be exposed to the outside.

The input device 110 may be implemented as a touch screen which is formed as the touch input unit is integrally formed with the display unit 151.

The communication device 130, the memory 140, the processor 170, the interface unit 180 and the power supply unit 190, and the printed circuit board may be disposed in an internal space that is formed by combining the display unit 151 and the case 400.

The case 400 may form a part of an outer shape of the electronic apparatus 100. For example, the case 400 may form a part of the front surface, the side surface, and the rear surface of the electronic apparatus 100. In some embodiments, the entire front outer shape of the electronic apparatus 100 may be implemented as the display unit 151, and the outer shape of the side and rear surfaces may be implemented as the case 400.

The case 400 may be combined with the display unit 151 with a printed circuit board interposed therebetween to form an outer shape. The case 400 may be combined with the display unit 151 with the communication device 130, the memory 140, the processor 170, the interface unit 180, and the power supply unit 190 interposed therebetween to form an outer shape.

Figure 7A:
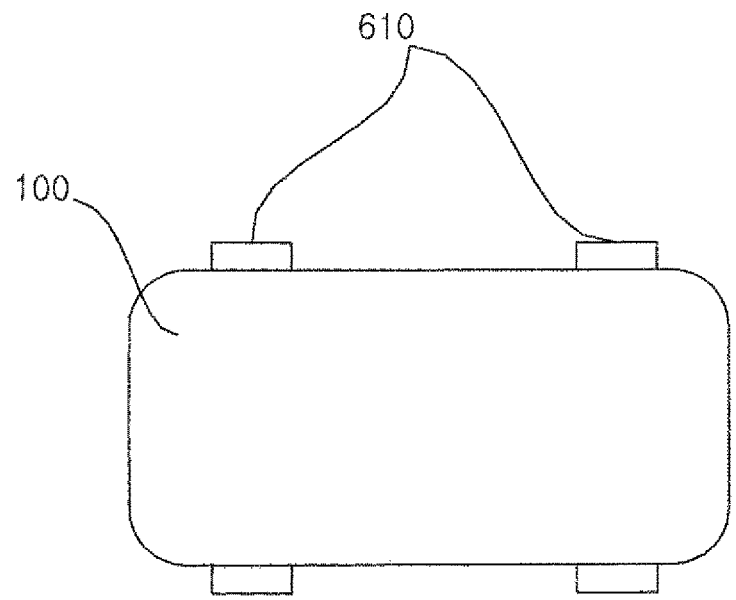
Figure 7A:
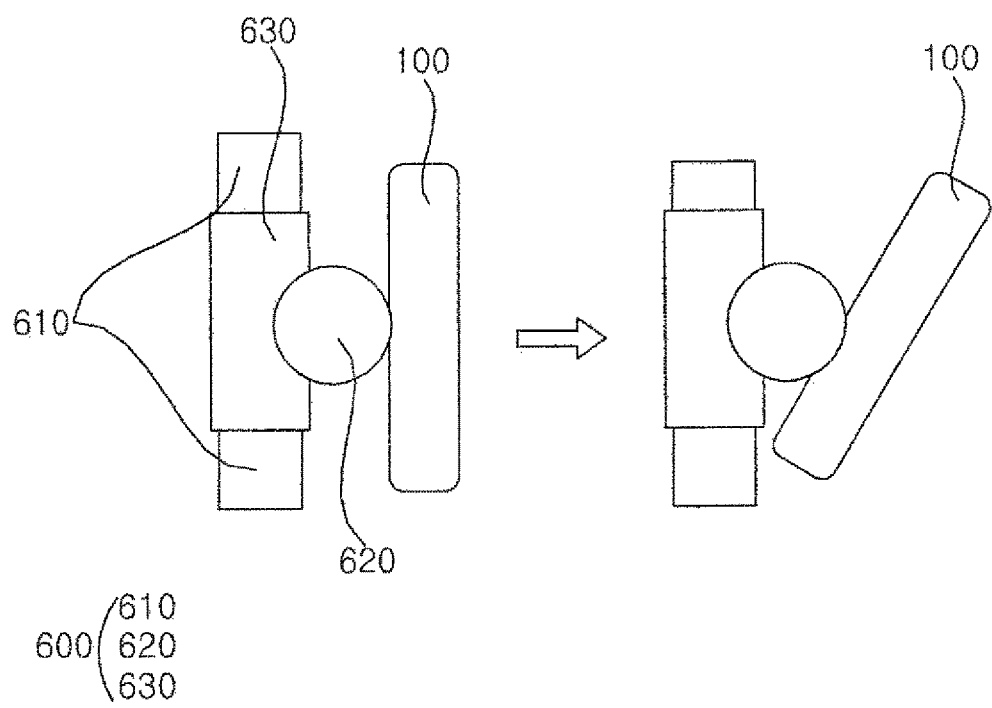
Figure 7B:
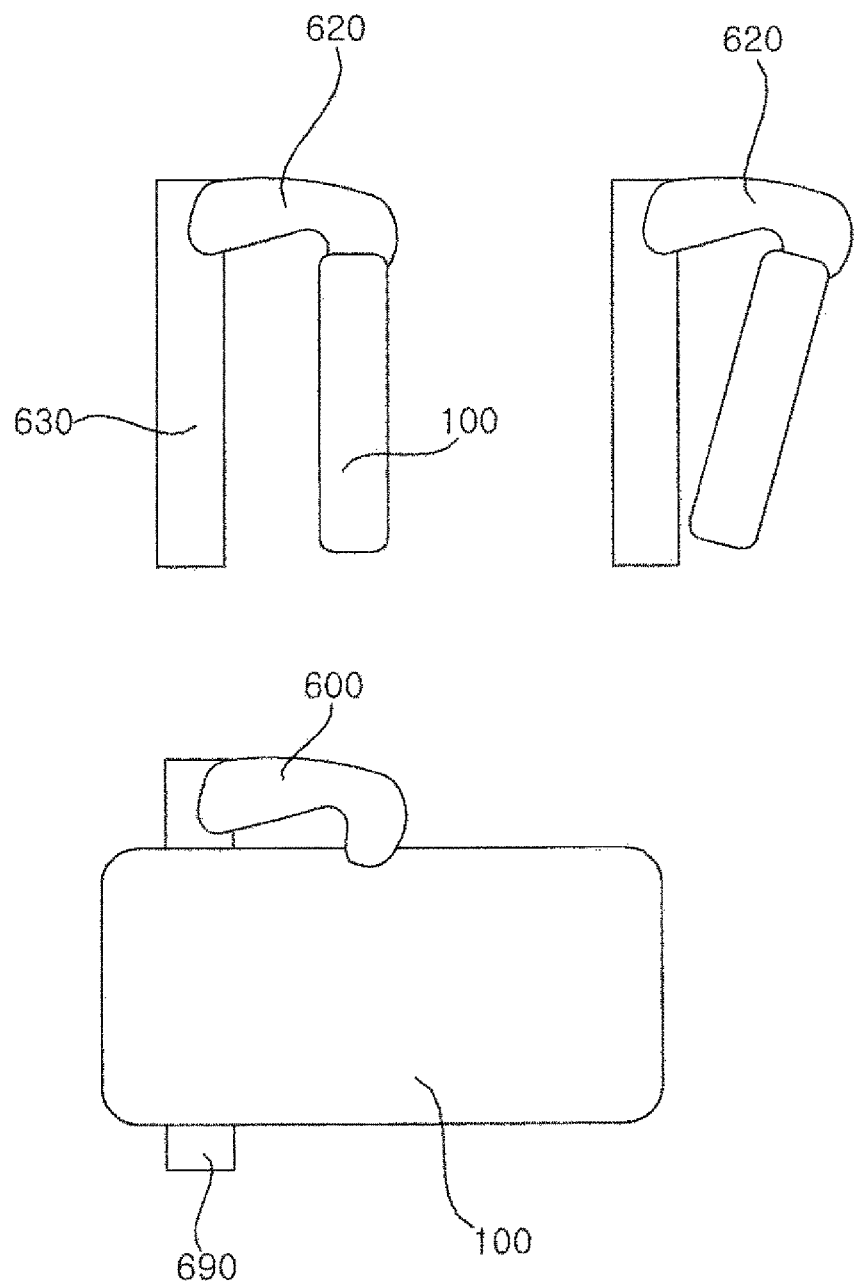

FIGS. 7A to 7B illustrate an electronic apparatus mounted in a vehicle seat according to an embodiment of the present disclosure.

Referring to FIG. 7A, the electronic apparatus 100 may include a mounting portion 600. The mounting portion 600 may fix the case 400 to a part of the vehicle seat. The mounting portion 600 may be connected to the case 400 to fix the electronic apparatus 100 to a portion of a vehicle seat 690. For example, the mounting portion 600 may fix the electronic apparatus 100 to a headrest.

The mounting portion 600 may include a fixing portion 610, a support portion 630, and a connection part 620. A pair of fixing portions 600 may be formed in a belt type. The fixing portion 600 may be connected to a support portion. The pair of fixing portions 600 may be formed of an elastic material, surround both sides of the headrest, respectively, and may fix the electronic apparatus 100 to the headrest by using an elastic force. The fixing portion 610 may be attached to both ends of the support portion 630.

The connection part 620 may be connected to the support portion 630 and the case 400. The connection portion 630 may be formed to be rotatable about a first axis in a vertical direction, a second axis in a left-right direction, or a third axis in a front-rear direction. As the connection part 620 rotates, the electronic apparatus 100 may be tilted about the first axis, the second axis, or the third axis. The display unit 151 may be tilted about the first axis extending in the vertical direction from the connection portion 630, the second axis extending in the left-right direction from the connection portion 630, or the third axis extending in the front-rear direction from the connection portion 630. Meanwhile, the vertical direction may mean a height direction with respect to the vehicle 10. The left-right direction may mean a width direction with respect to the vehicle 10. The front-rear direction may refer to a direction of overall length with respect to the vehicle 10.

The mounting portion 600 may further include a driving unit. The driving unit may provide a rotational driving force to the connection part 620, based on a control signal provided from the processor 170. The driving unit may be implemented as a motor. In some embodiments, the mounting portion 600 may further include a driving force transmitting unit, such as a gear, that transmits a driving force generated by the driving unit. The processor 170 may provide the control signal to the driving unit, based on the gaze information of passenger.

Referring to FIG. 7B, the connection part 620 may be connected to an upper end of the support portion 630. The connection part 620 may be connected to the upper end of the case 400. One end of the connection part 620 may be connected to the case 400 so that the electronic apparatus 100 can rotate. The electronic apparatus 100 may be tilted about an axis extending in the left-right direction from a connection portion between the connection part 620 and the case 400. In this case, the display unit 151 may be tilted about an axis extending in the left-right direction from the connection portion. The electronic apparatus 100 may be tilted about an axis extending in the vertical direction from the connection portion between the connection part 620 and the case 400. In this case, the display unit 151 may be tilted about an axis extending in the vertical direction from the connection portion.

Figure 8:
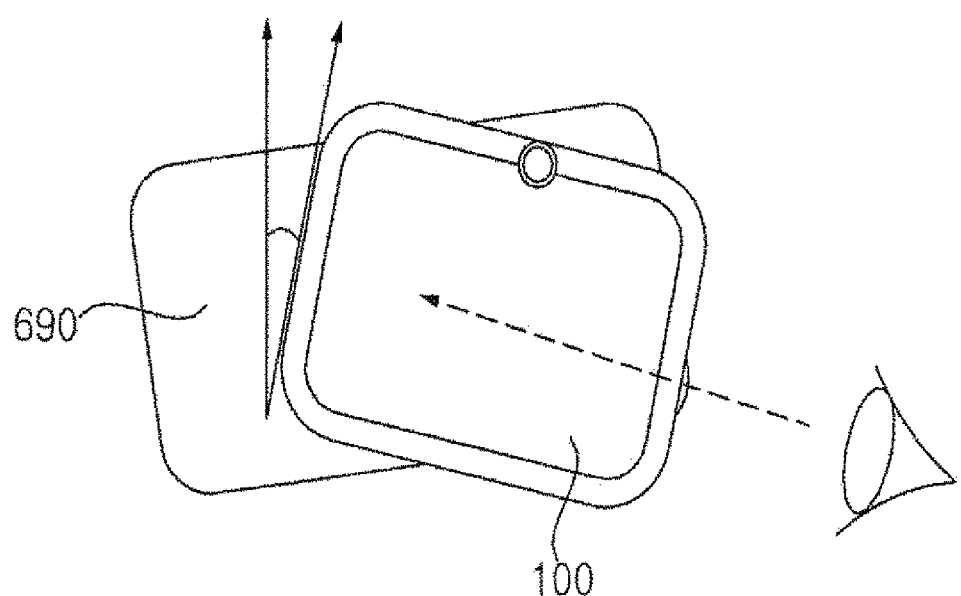
Figure 9:
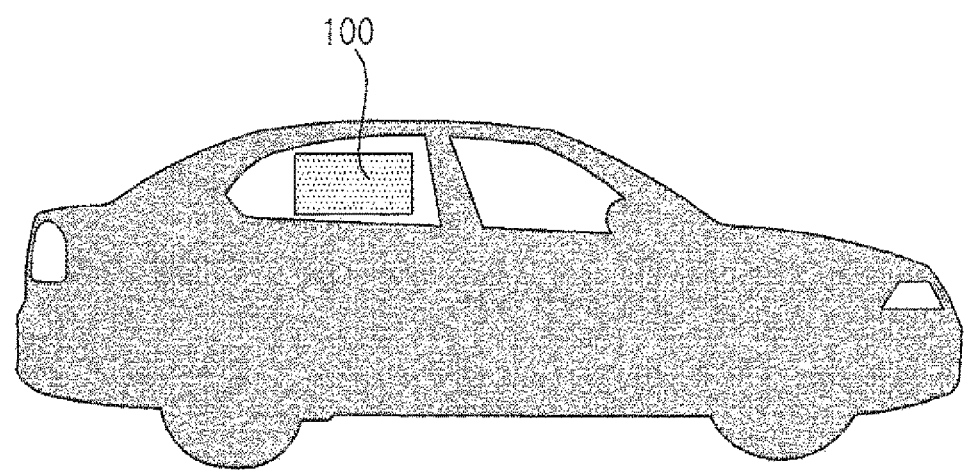

FIGS. 8 to 9 are diagrams illustrating a tilted state of an electronic apparatus according to an embodiment of the present disclosure.

Referring to FIG. 8, the electronic apparatus 100 may be tilted, based on the rotational driving force generated by the driving unit. The display unit 151 may rotate based on the rotational driving force generated by the driving unit. The processor 170 may set a virtual line which connects the left eye and the right eye of a passenger. The processor 170 may provide a control signal to the driving unit such that the virtual line and the length or width of the display unit 151 are parallel to each other. The processor 170 may provide a control signal to the driving unit based on a signal received from the user interface device 200 through the communication device 120.

Referring to FIG. 9, the electronic apparatus 100 may be tilted based on the rotational driving force generated by the driving unit. The display unit 151 may rotate based on the rotational driving force generated by the driving unit. For example, when a passenger does not exist in the vehicle 10, the display unit 151 may rotate to face the outside of the vehicle 10. The processor 170 may provide a control signal to the driving unit, based on a signal received from the mobile terminal through the communication device 120.

Figure 10:
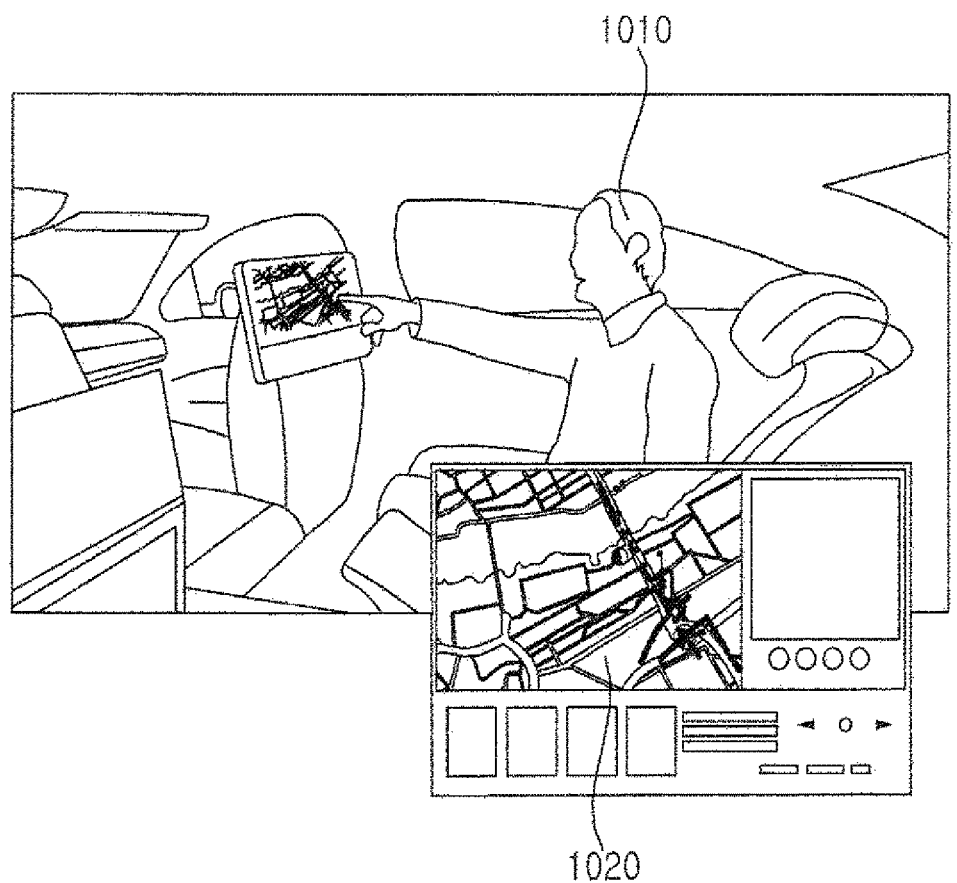
FIGS. 10 to 12 are diagrams referenced for explaining an operation of an in-vehicle electronic apparatus according to an embodiment of the present disclosure.
Figure 11:
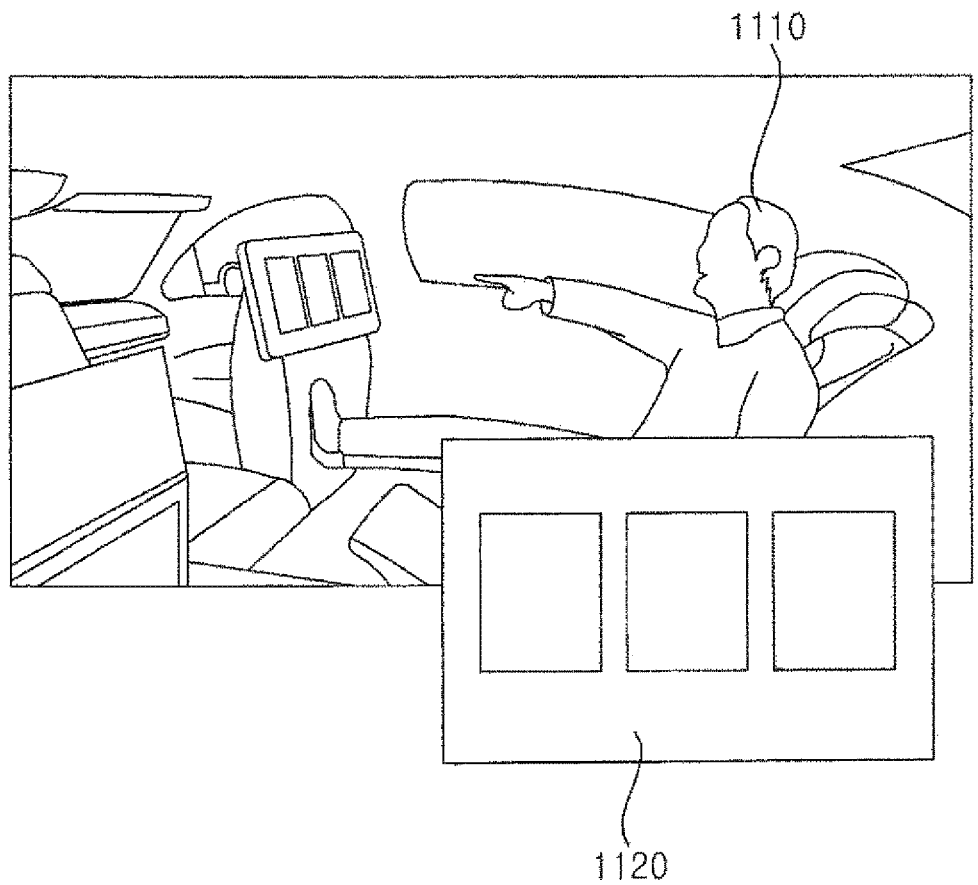
Figure 11:
Figure 12:
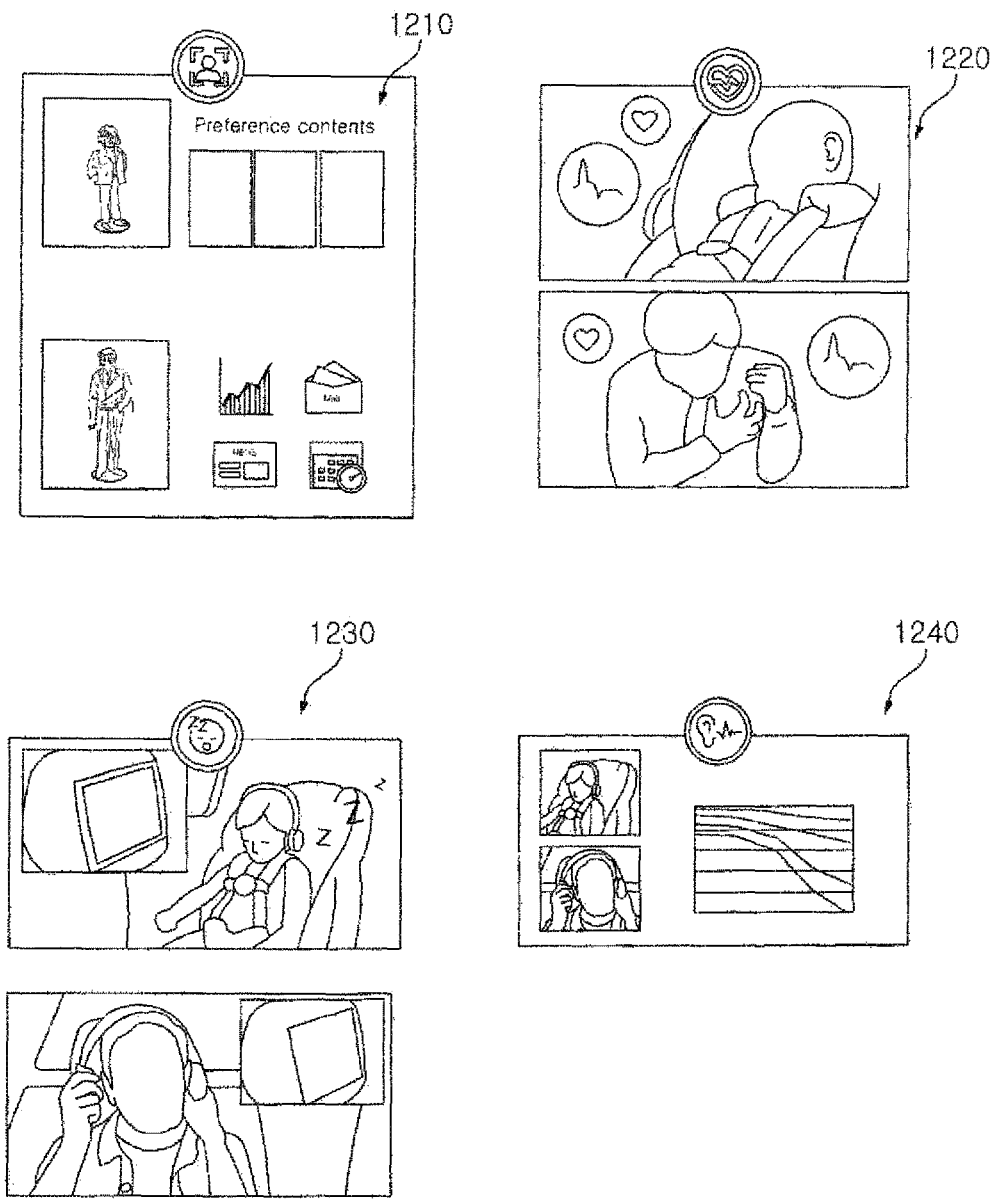

FIGS. 10 to 12 are diagrams referenced for explaining an operation of an in-vehicle electronic apparatus according to an embodiment of the present disclosure.

Referring to the drawings, the processor 170 may determine the posture of the passenger, based on the vehicle inner image data. For example, the processor 170 may determine the posture of the passenger, based on a distance value between the passenger's head and the camera. For example, the processor 170 may determine the posture of the passenger, based on whether the passenger's back or head is in contact with the seat.

Referring to FIG. 10, the processor 170 may determine the posture of the passenger as a lean forward posture 1010. When it is determined that the posture of the passenger is the lean forward posture 1010, the processor 170 may select a touch input method through the user input interface. The user may control the electronic apparatus 100 by touching the display unit 151.

Referring to FIG. 11, the processor 170 may determine the posture of the passenger as a lean back posture 1110. When it is determined that the posture of the passenger is the lean back 1110, the processor 170 may select a hand gesture input method through the user input interface. The processor 170 may generate a virtual line connecting the passenger's gaze and the passenger's finger, based on the vehicle inner image. The processor 170 may display a pointer at a point where the virtual line meets the display unit 151. When sensing a specific gesture of the user in a state where the pointer is generated, the processor 170 may perform an operation corresponding to a point where the pointer is located.

Referring to FIG. 12, as illustrated by reference numeral 1210, the processor 170 may acquire age information of the passenger based on vehicle inner image data, and may output content matched with the age information. The processor 170 may authenticate the passenger based on the vehicle inner image data, and output content suitable for the authenticated passenger's preference. The processor 170 may detect a facial expression or mood of a passenger based on the vehicle inner image data, and may provide content for each passenger.

As illustrated by reference numeral 1220, the processor 170 may recognize the passenger's bio-signal and generate an emergency signal. In some embodiments, the camera 130 may include a biometric camera. When detecting an abnormality of the passenger, the processor 170 may transmit the situation to a driver. If a passenger whose abnormality is detected is the driver, the processor 170 may provide a signal for inducing the vehicle 10's parking on the shoulder of a road. The processor 170 may provide a signal for an emergency rescue request to other nearby vehicles.

As illustrated by reference numeral 1230, the processor 170 may control the output of content by recognizing the behavior of the passenger. When it is determined that the passenger's state is a sleep state, the processor 170 may stop the reproduced image content and sound content. When it is determined that the passenger takes off the headphones, the processor 170 may stop the reproduced image content and sound content. When it is determined that the user gazes at a still screen for a preset time or longer, the processor 170 may recommend continuous viewing of the content.

As illustrated by reference numeral 1240, the processor 170 may set a sound environment for each age of the passenger. When it is determined that the passenger is a child, the processor 170 may control the sound to be output in a low volume. When it is determined that the passenger is an adult, the processor 170 may control the sound to be output at a low frequency.

The present disclosure described above can be implemented as computer readable codes on a medium on which a program is recorded. The computer readable medium includes all kinds of recording apparatuses in which data that can be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, and may also be implemented in the form of a carrier wave (e.g., transmission over the Internet). In addition, the computer may include a processor or a controller. Accordingly, the above detailed description is to be considered in all respects as illustrative and not restrictive. The scope of the present disclosure should be determined by rational interpretation of the appended claims, and all changes within the scope of equivalents of the present disclosure are included in the scope of the present disclosure.

EXPLANATION OF REFERENCE NUMERAL

10: Vehicle
100: Electronic apparatus

The invention claimed is:

1. An electronic apparatus comprising:
   a camera;
   a display unit;
   a processor configured to monitor a passenger, based on a vehicle internal image data generated by the camera;
   a case configured to form an outer shape; and
   a mounting portion configured to fix the case to a portion of a vehicle seat,
   wherein the processor is further configured to:
      determine a posture of the passenger, based on the vehicle internal image data, and
      select a user input method, based on information of the posture of the passenger.

2. The electronic apparatus of claim 1, wherein the mounting portion comprises a connection part formed to be rotatable about a first axis in a vertical direction or a second axis in a left-right direction.

3. The electronic apparatus of claim 2, wherein the mounting portion further comprises a driving unit configured to provide a rotational driving force to the connection part, based on a control signal provided by the processor,
   wherein the processor provides the control signal, based on passenger posture information.

4. The electronic apparatus of claim 1, wherein the processor selects a touch input method, when it is determined that the posture of the passenger is a lean forward posture.

5. The electronic apparatus of claim 1, wherein the processor selects a hand gesture input method, when it is determined that the posture of the passenger is a lean back posture.

6. The electronic apparatus of claim 1, further comprising a communication device configured to exchange a signal with a user interface device provided in the vehicle,
    wherein the processor provides a signal for outputting an alarm to the user interface device through the communication device, when it is determined that a passenger's state is an abnormal state.

7. The electronic apparatus of claim 6, further comprising a communication device configured to exchange a signal with a mobile terminal,
    wherein the processor provides vehicle inner image data to the mobile terminal, when a passenger is detected in a state in which a preset time or longer is elapsed after an ignition of the vehicle is turned off.

8. The electronic apparatus of claim 1, wherein the processor acquires passenger information, based on the vehicle inner image data, and controls output of content through the display unit, based on the passenger information.

\* \* \* \* \*